(12) United States Patent
Han et al.

(10) Patent No.: US 7,596,318 B2
(45) Date of Patent: Sep. 29, 2009

(54) ADDRESSING METHOD OF QUANTA NETWORK AND QUANTA NETWORK ROUTER

(75) Inventors: Zhengfu Han, Anhui (CN); Tao Zhang, Anhui (CN); Guangcan Guo, Anhui (CN)

(73) Assignee: University of Science and Technology of China, Anhui, P.R. (CN)

( * ) Notice: Subject to any disclaimer, the term of this patent is extended or adjusted under 35 U.S.C. 154(b) by 509 days.

(21) Appl. No.: 10/563,224

(22) PCT Filed: Jun. 25, 2004

(86) PCT No.: PCT/CN2004/000689

§ 371 (c)(1),
(2), (4) Date: Jan. 3, 2006

(87) PCT Pub. No.: WO2005/004355

PCT Pub. Date: Jan. 13, 2005

(65) Prior Publication Data

US 2006/0210270 A1      Sep. 21, 2006

(30) Foreign Application Priority Data

Jul. 8, 2003      (CN) ................ 03 1 32014

(51) Int. Cl.
*H04J 14/00* (2006.01)

(52) U.S. Cl. .............................. 398/69; 398/48; 398/82

(58) Field of Classification Search ............... 398/49, 398/66, 69, 165, 166, 48, 50, 51, 63, 68, 398/82

See application file for complete search history.

(56) References Cited

U.S. PATENT DOCUMENTS 5,327,276 A * 7/1994 Shimosaka et al. ........... 398/58

(Continued)

FOREIGN PATENT DOCUMENTS

| CN | 1229313 A | 9/1999 |
|----|-----------|--------|
| WO | WO 98/25659 | 7/1998 |
| WO | WO 01/67676 A2 | 9/2001 |
| WO | WO 01/93527 | 12/2001 |

*Primary Examiner*—Christina Y Leung
(74) *Attorney, Agent, or Firm*—Westman, Champlin & Kelly, P.A.

(57) ABSTRACT

An addressing method of quantum network and a quantum network router are disclosed. There are at least three nodes in the network. The method comprises steps of: appointing an address serial number for every node; sending photon signals with different wavelength from one node to other nodes, wherein the signal source wavelength and node address are regarded as an addressing badge; determining, by every node, the source of signal according to the addressing badge of received photon signals. Quantum network router comprises a photon signal allocator including N sets of optical components, one end of every optical component is mix-wavelength interface, and the other end includes separate wavelength interfaces; an external interface comprising mix-wavelength interfaces of optical components, separate wavelength interfaces of different optical components, which transmit the same wavelength signals, connect one to one. Using this invention can realize quantum communication in deed, includes quantum cryptographic key distribution, quantum network transmission, namely generalized quantum communication, and compose quantum computer addressing bus or quantum computer network, etc.

7 Claims, 4 Drawing Sheets

U.S. PATENT DOCUMENTS

| | | | |
|---|---|---|---|
| 5,440,416 A * | 8/1995 | Cohen et al. | 398/82 |
| 5,539,560 A * | 7/1996 | Dennis et al. | 398/49 |
| 5,615,290 A * | 3/1997 | Harasawa et al. | 385/24 |
| 5,959,749 A * | 9/1999 | Danagher et al. | 398/83 |
| 5,963,348 A * | 10/1999 | Oberg | 398/5 |
| 5,978,373 A | 11/1999 | Hoff et al. | 370/392 |
| 6,111,673 A * | 8/2000 | Chang et al. | 398/79 |

* cited by examiner

|  | node 1 | node 2 | node 3 |
|---|---|---|---|
| node 1 |  | $\lambda_2$ | $\lambda_1$ |
| node 2 | $\lambda_2$ |  | $\lambda_3$ |
| node 3 | $\lambda_1$ | $\lambda_3$ |  |

Fig. 6

|  | user 1 | user 2 | user 3 | user 4 |
|---|---|---|---|---|
| user 1 |  | $\lambda_1$ | $\lambda_2$ | $\lambda_3$ |
| user 2 | $\lambda_1$ |  | $\lambda_3$ | $\lambda_2$ |
| user 3 | $\lambda_2$ | $\lambda_3$ |  | $\lambda_1$ |
| user 4 | $\lambda_3$ | $\lambda_2$ | $\lambda_1$ |  |

ADDRESSING METHOD OF QUANTA NETWORK AND QUANTA NETWORK ROUTER

CROSS-REFERENCE TO RELATED APPLICATION

This Application is a Section 371 National Stage Application of International Application No. PCT/CN2004/000689, filed Jun. 25, 2004 and published as WO 2005/004355 A1 on Jan. 13, 2005, and published in Chinese, the content of which is hereby incorporated by reference in its entirety.

BACKGROUND OF THE INVENTION

1. Field of the Invention

This invention relates to an addressing method and apparatus which can be used for network communication via light transmission technology, and more particularly relates to an addressing method and apparatus for quantum information, including quantum communication and a quantum computation network system.

2. Description of the Related Art

Quantum information technology is a new scientific field which started in the 1990s. There are many problems being researched, and it is not applied on a large scale, so there will not be any open technologies related to this invention. According to the experience about classical network information technology, quantum network information technology will be the kernel technology of quantum communication. Comparing with classical communication and considering the characteristics of quantum communication, a quantum network system must satisfy these basic capability requirements:

1. multi-user

More than two users can exchange information and share resource at the same time.

2. extensibility

The number of users can increase and should not be limited theoretically.

3. independence of the users

This should include two parts: first, the existence and movement of any user only affect those users who exchange information with this user, not the whole network; second, the movement of any user should not be affected by other users except for the one who exchange information with this user, namely crosstalk.

4. Any user in the network should have one and only address or internal serial number (e.g. IP address in classical network), with this address, user can easily distinguish and connect to the user he want to communicate with, the user who is connected can also make sure which user he is talking to.

Special requirements of quantum network:

5. A network system should keep quantum coherence (except receiving and measurement), that means any decoherence process should be as weak as possible, and the system should not have any photoelectric or electrooptic conversion process except for receiving and measurement.

6. There should not be any amplification of the quantum signal inside the network system. This is the basic requirement of quantum no-cloning theorem.

Up to now, there are no quantum network framework theory and technology that accord with all the requirements above. The research on quantum key distribution over a network has made the biggest progress in this field; existing main technologies come down to:

1. tree topology network

This network has two working modes. One mode is, sending modulated single photons to multiple receivers randomly by fibered beam splitters, and then making quantum key distribution between sender and receivers. This mode needs a control center, all users have to share information with control center, that would be unendurable in secure communication sometimes, and besides, communication efficiency is in inverse ratio to the number of terminals in the network and descends when communication distance increases, that limits the extensibility of the network. The other mode uses wavelength addressing, that is, control center uses wavelength as address of receiver, makes quantum key distribution with any user. This mode solves the problem that communication efficiency decreases because of the beam splitters, but the security problem, sharing information with a control center, still exists. Another important problem is, users besides the control center can not communicate directly with each other, so a tree topology network is not a network proper.

2. ring topology network

This network links all users one by one to make one or more closed rings, any two users in the ring make secure communication by certain protocol with the help of control center and do not share any secure information with the center. In this network, all users must be in the ring, which limits the location of the user; the average communication distance between any two users is less than half of the ultimate quantum key distribution distance, and the more users it has, the smaller distance there will be between the adjacent users. This network has already has three modes, first one link with each user in series; an improved one uses a "space optical switch" to link many small rings to a big ring, every user can be on/off the big ring by using the "space optical switch", this can achieve variable area quantum network, but in any case, there is only one pair of users can work at the same time; the third one use wavelength addressing, theoretically users can communicate with each other directly without center and work at the same time, but the limitation of the communication distance still exists, the number of wavelength must satisfy $N=n*(n-1)/2$, here N is the number of wavelength, n is the number of users, this limits the number of users in the network.

3. multi-particles entanglement network

This network can achieve quantum state transmission between multi-users, and is not only a quantum key distribution network, but also a generalized quantum information network. The problem is, the number of entangled particles has minus exponential relationship with product efficiency, and the number of users relates to the number of entangled particles directly, so the number of users is small, expansibility of the network is bad.

In a word, there is no network satisfy the basic requirements of quantum network at present.

SUMMARY OF THE INVENTION

It is an object of the present invention to provide an addressing method of a quantum network and a quantum network router. With this router, we can construct an equiweighted multi-user quantum network system.

The network includes at least three nodes, and the method comprises steps of: appointing each node an address serial number; sending photon signals having different wavelengths from each node to other nodes, wherein each of the photon signals regards signal source wavelength and node address as an addressing badge, said addressing badge is made up of two parts, one part is determined by the wavelength of the photon signal which the node sends, the other part is determined by the address serial number of the node; and determining, by each node, where the photon signals come from by using the addressing badges of the photon signals.

When the number of nodes in the network is odd, the number of said signal source wavelength is N; when the number of nodes is even, the number of said signal source wavelength is N−1; here N is the number of nodes in the network.

Said photon signal is optical quantum state signal, or classical optical signal.

This addressing method can transmit photon signals having different wavelengths from any node in the network to appointed other node, this kind of transmission is one and only in the network, transmission direction is reversible, that means any node can transmit and receive photon signal, sender aforehand knows where the photon signal having certain wavelength is sent to, receiver knows where the photon signal he receives comes from by measuring the wavelength of the photon signal. Said network can have unlimited amount of nodes.

Said photon signal can be classical signal, e.g. optical pulse comprising lots of photons, it can also be quantum signal, e.g. single photon or entangled photons; said wavelength means a wavelength interval. When the signal is classical signal, the communication process is classical communication, when the signal is optical quantum state, the communication process is quantum communication.

This invention provides a quantum network router to implement said addressing method, it includes a photon signal allocator, the photon signal allocator includes N sets of optical component, here N is the number of nodes in the network, one end of every optical component is mix-wavelength interface, the other end includes separate wavelength interfaces; and an external interface comprising mix-wavelength interfaces of optical components, wherein the number of separate wavelength interfaces is at least N−1, every separate wavelength interface transmits different photon signals having different wavelengths, separate wavelength interfaces of different optical components, which transmit the same wavelength signals, connect one to one.

When N is even, said separate wavelength interfaces of optical components are the same, the total number of wavelength used in the whole quantum network router is N−1; when N is odd, any two optical components have one different separate wavelength interface, the total number of wavelength used in the whole quantum network router is N. For example, considered about a router of four optical components, said optical components are the same, each one has three separate wavelength interfaces, i.e. λ1, λ2, λ3, the total number of wavelength used in the router is three; for router of three optical components, each component has two separate wavelength interfaces, but they are not the same, i.e. No. 1 component has λ1 and λ2, No. 2 has λ2 and λ3, No. 3 has λ3 and λ1, the total number of wavelength used in the router is three too.

Said optical component can be made up of integrated or separate dispersive and accessorial passive optical components.

Said optical component can be reversible wavelength division multiplexer.

Said optical connection can be achieved via fiber, waveguide, free space or other optical medium.

Said optical connection can add collimating, coupling or reflecting optical passive components in the optical path to improve the optical capability of the connection.

Said optical components of the whole quantum network router, include dispersive, collimating, orienting or coupling components, can be integrated with wave-guide substrate totally or partially.

The internal connections of the quantum network router accord with edge coloring theorem of a graph, any router can be constructed according to this theorem. The correspondence principle is: vertex in edge coloring theorem corresponds to optical component in quantum network router; color corresponds to wavelength (i.e. separate wavelength interface in said optical component). In fact, we can look a quantum network router with odd nodes N as a router with nodes N+1, which have one node free or not connected.

Said photon signal can be transmitted from one node to another, reverse transmission is also allowed.

Said reversible wavelength division multiplexer comprises dispersive part, front/back collimating part and input/output coupler, wherein dispersive part can be filter, raster or dispersive prism.

The quantum network router of this invention can achieve: receiving photon signals having different wavelengths from all nodes in the network, transmitting the photon signals having different wavelengths which have same aim to their destination by division and coupling, these photon signals can finally be transmitted to certain user by arterial fiber. The working mode of this router won't destroy the quantum state and its coherence, there is not crosstalk either, every path is exclusive, no path superposition or signal loss, user can know where the signal comes from by simply measurement. All above satisfy the basic requirement of network.

Said all functions correspond to path choosing function in classical communication network or addressing function in computer network. The number of nodes in this quantum network router is unlimited theoretically. With this router and arterial fiber, we can construct a complete quantum network system.

The addressing method and quantum network router in this invention, regard sender's address and wavelength of quantum state as addressing badge, provides an apparatus of quantum network according to said addressing method, can satisfy the basic requirements of quantum network.

Quantum communication with this invention has many advantages as follows:

1. Take the router as exchanging and routing center of quantum network, the structure of network is independent from users, so the quantum network is similar to classical network, the system composition and operation can be separated and manage canonically.
2. The number of nodes in the router can increase. The total number of wavelength that the router uses is less than the number of nodes, the utilization efficiency of wave band is high, theoretically the wave band can be divided into any shares and utilize repeatedly, the amount of nodes can increase unlimitedly. According to current technology, the amount of nodes can be more than 150, is 3 times bigger than other method.
3. Nodes communicate with different wavelength, channels are separated from each other, isolation of channels only depends on isolation of wavelength division multiplexer, there is little crosstalk and no contention of resource between channels, communication efficiency is impervious to the amount of nodes.
4. The router of this invention has a low insertion loss, less than 2 dB for each channel.
5. Using this invention one can realize quanta communication, including quanta cryptographic key distribution, quanta network transmission, namely generalized quanta communication, composing quanta computer addressing bus or quantum computer network, etc.
6. Because the quantum network comes from a classical network appending some limitation, this quantum network router can be an optical router in classical communication, realize static routing function in classical communication network.

DETAILED DESCRIPTION OF THE INVENTION

Structure of Quantum Network Router

Figure 1:
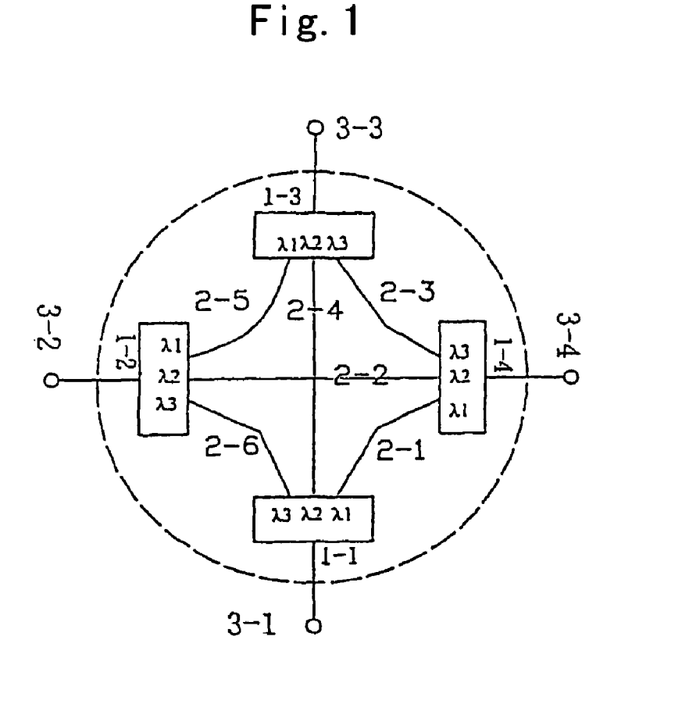
FIG. 1 is a block diagram of internal structure of 4 nodes quantum network router which is made up of commercial wavelength division multiplexers.

1. A Quantum Network Router which is made up of Commercial Wavelength Division Multiplexers A quantum network router can be made up of commercial wavelength division multiplexers according to the principle of the invention. FIG. 1 shows a typically block diagram of internal structure of 4 nodes quantum network router. As shown in FIG. 1, inside dashed is the internal structure of router, 1-1~1-4 are the same commercial wavelength division multiplexers, $\lambda 1, \lambda 2, \lambda 3$ are different wavelengths (in fact it is wave band of certain width) which should satisfy the requirement of insertion loss and isolation; 2-1~2-6 are connections between separate wavelength interfaces which have the same wavelength, they can be optical paths comprising single mode fiber, separate component or wave-guide; 3-1~3-4 are mix-wavelength interfaces, and can be connected with users by arterial fiber.

Figure 2:
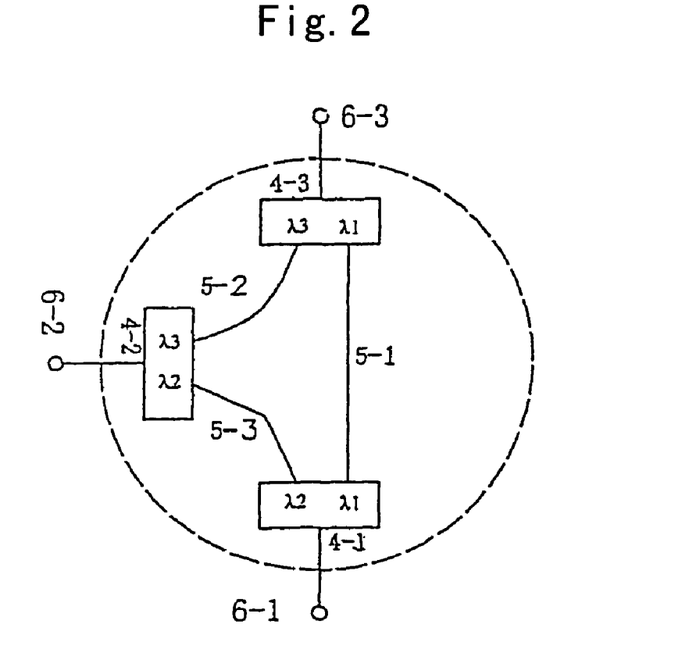
FIG. 2 is a block diagram of internal structure of 3 nodes quantum network router which is made up of commercial wavelength division multiplexers.

FIG. 2 shows internal structure of three nodes quantum network router, wherein 4-1~4-3 are wavelength division multiplexers, the difference from four nodes router is, every multiplexer has different wavelengths, 4-1 has $\lambda 1$ and $\lambda 2$, 4-2 has $\lambda 2$ and $\lambda 3$, 4-3 has $\lambda 3$ and $\lambda 1$, the total number of wavelength is three. 5-1~5-3 are connections between separate wavelength interfaces which have the same wavelength, they can be optical paths comprising single mode fiber, separate component or wave-guide; 6-1~6-3 are mix-wavelength interfaces, and can be connected with users by arterial fiber. In fact, this three nodes router can be looked as a special four nodes router in FIG. 1 with one node and all connections with it disappeared.

If put multiplexer 1-2 and connections 2-2 2-5 2-6 in FIG. 1 away, four nodes router in FIG. 1 will become three nodes router in FIG. 2. Similarly, any router with even nodes N can become N-1 nodes router by putting one node away.

Any N nodes router can be constructed with multiplexers according to principle above described, router with odd nodes is similar to FIG. 2, and router with even nodes is similar to FIG. 1.

2. 4 Nodes Quantum Network Router which is made up of Separate Components

Quantum network router can be made up of separate passive optical components instead of making wavelength division multiplexer first and then constructing quantum network router. This kind of router with N nodes can be made up of N dispersive components and accessorial orienting parts, e.g. collimating, coupling or reflecting optical passive components, prism or other refracting device.

Figure 3:
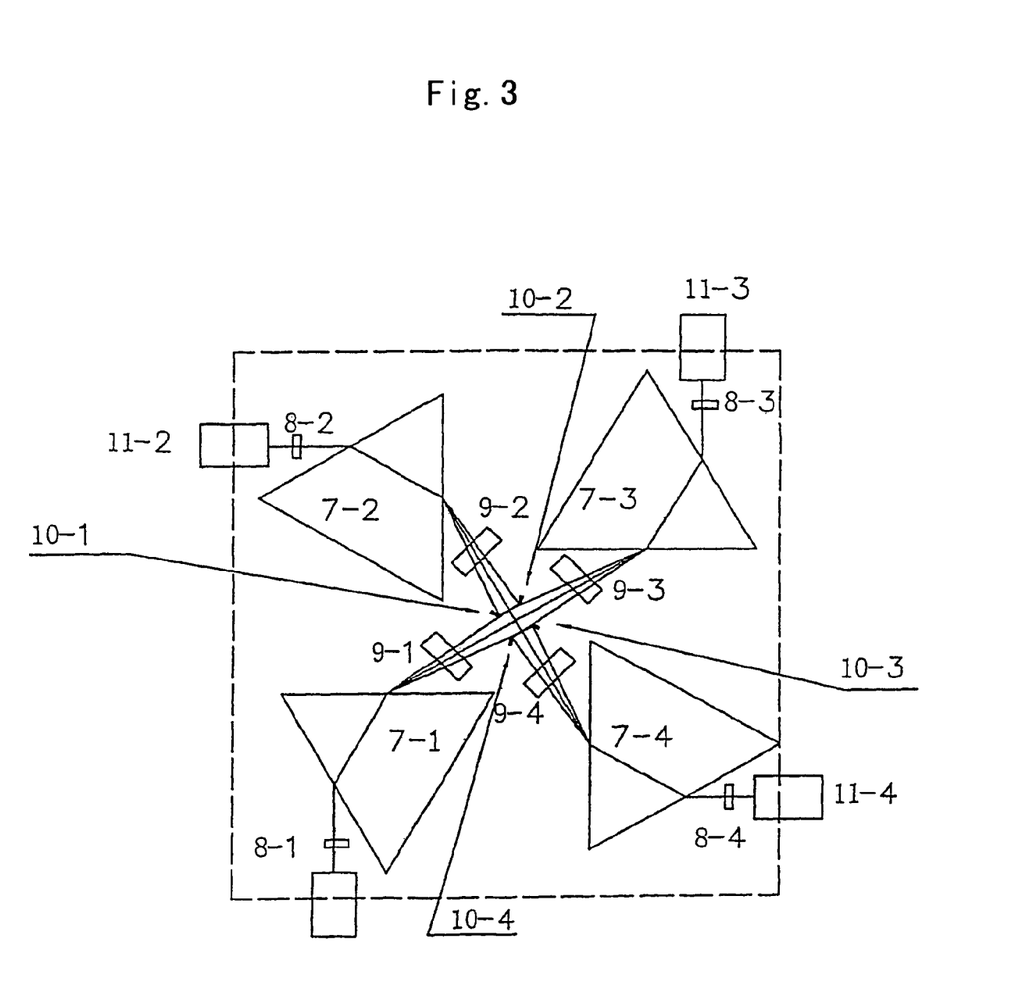
FIG. 3 is a block diagram of internal structure of 4 nodes quantum network router which is made up of separate components.

FIG. 3 shows the internal structure of four nodes quantum network router which is made up of separate components. 7-1~7-4 are dispersive components and can achieve splitting and coupling of signal, they can be prism, filter or raster. 8-1~8-4 and 9-1~9-4 are front/back collimating system; its function is collimating and focalizing of ray. 10-1~10-4 are orienting components, its function is orienting ray to certain dispersive component; 11-1~11-4 input/output couplers; they connect with users by arterial fiber.

3. Integrated Quantum Network Router

Quantum network router can be made up of integrated optical components. N nodes router can be made up of N integrated dispersive components and orienting wave-guide.

Figure 4:
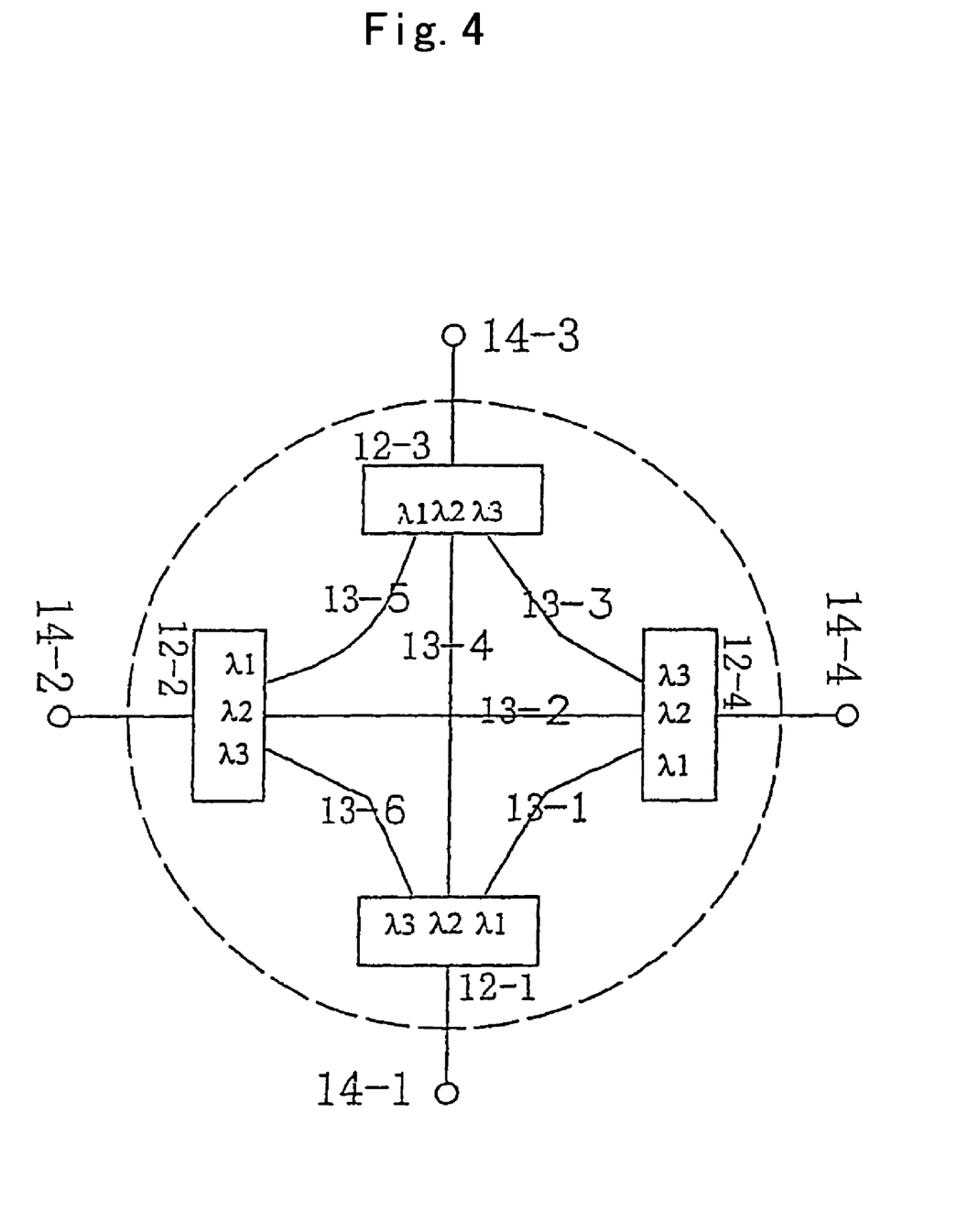
FIG. 4 is a block diagram of internal structure of integrated 4 nodes quantum network router.

FIG. 4 shows four nodes integrated quantum network router. 12-1~12-4 are integrated raster, their function is, separate mix-wavelength signal to single wavelength signals or reverse; 13-1~13-6 are wave-guide for single wavelength signal, transmit the signal to raster; 14-1~14-4 are mix-wavelength interfaces, they connect with users by arterial fiber.

Figure 5:
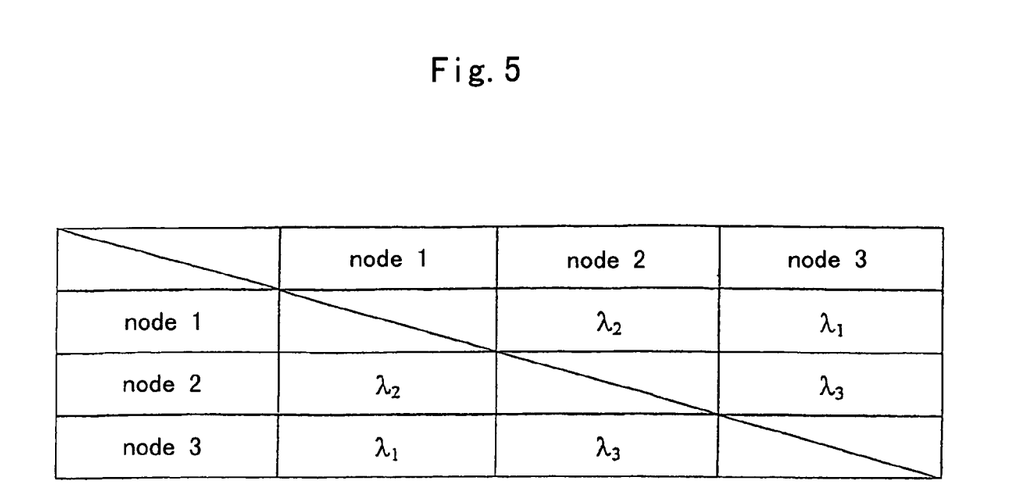
FIG. 5 is a form of IP address of 3 nodes quantum network router.
Figure 6:
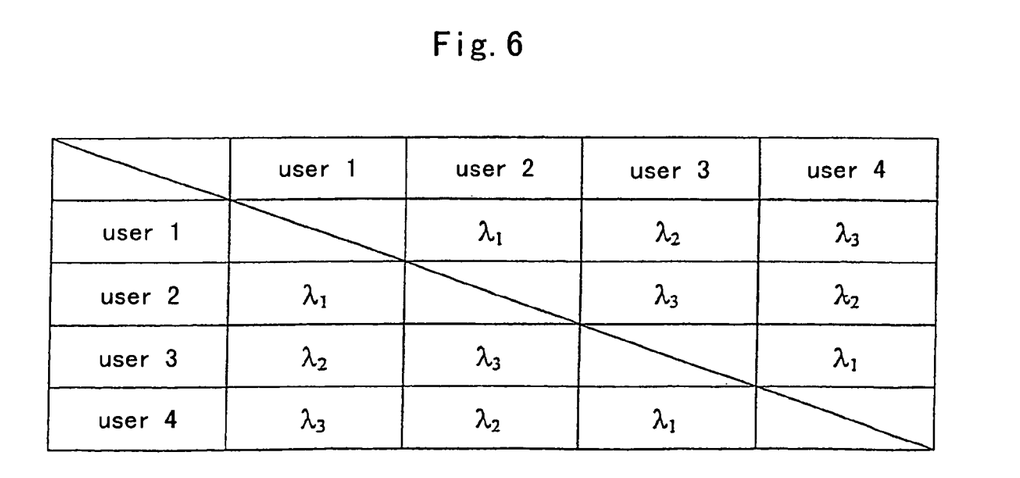
FIG. 6 is a form of IP address of 4 nodes quantum network router.

When a quantum network router is finished, every node has a form of IP address, the user connect with this node can find the address of other users according to the form and communicate with them. FIG. 5 and FIG. 6 show the forms of IP address for three nodes and four nodes quantum network router. For a router with more than four nodes, there is also a form of IP address, form for odd nodes router is similar to FIG. 5, form for even nodes router is similar to FIG. 6.

What is claimed is:

1. A method of addressing in a quantum network which includes N nodes with a star-configuration, wherein N is larger than 3, the method comprising steps of:
    appointing each node an address serial number;
    determining by a source node a transmission wavelength from a lookup table which is formed of the address serial number of each node and the transmission wavelength used between every two nodes, wherein when the number of nodes in the quantum network is odd, the total number of said transmission wavelengths is N; when the number of nodes in the quantum network is even, the total number of transmission wavelengths is N−1;
    transmitting from the source node to a destination node an optical quantum state signal on the determined wavelength; and
    determining, by the destination node, the source of the received optical quantum state signal from a lookup table by using the transmission wavelength of the received optical quantum state signal.

2. A router in a quantum network which includes N nodes with a star-configuration, wherein N is larger than 3 and each node is appointed an address serial number, the router comprising:
    N optical components each comprising a mix wavelength interface which is an external interface of the router, and at least N−1 separate wavelength interfaces, wherein every separate wavelength interface transmits different optical quantum state signals having different wavelengths, and each of separate wavelength interfaces of different optical components, which transmit the same wavelength signals, are directly coupled to one another; and lookup table at each node which stores the address serial number of each node and the transmission wavelength used between every two nodes, wherein when the number of nodes in the quantum network is odd, the total number of said transmission wavelengths is N; when the number of nodes in the quantum network is even, the total number of said transmission wavelengths is N−1;

wherein, a source node is adapted to determine a transmission wavelength from a lookup table and transmit to a destination node an optical quantum state signal on the determined wavelength through an optical connection, and the destination node is adapted to determine the source of the received optical quantum state signal from a lookup table by using the transmission wavelength of the received optical quantum state signal.

3. The router of claim 2, wherein said optical component is made up of integrated or separate dispersive and accessorial passive optical components.

4. The router of claim 2, wherein said optical component is reversible wavelength division multiplexer.

5. The router of claim 2, wherein said optical connection is achieved via fiber, wave-guide, free space or other optical medium.

6. The router of claim 2, wherein collimating, coupling or reflecting optical passive components are added in the optical connection to improve the optical capability of the connection.

7. The router of claim 6, wherein said optical components of the router, include dispersive, collimating, orienting or coupling components, are integrated with wave-guide substrate totally or partially.

* * * * *

UNITED STATES PATENT AND TRADEMARK OFFICE
CERTIFICATE OF CORRECTION

| | | |
|---|---|---|
| PATENT NO. | : 7,596,318 B2 | Page 1 of 1 |
| APPLICATION NO. | : 10/563224 | |
| DATED | : September 29, 2009 | |
| INVENTOR(S) | : Han et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 604 days.

Signed and Sealed this

Twenty-eighth Day of September, 2010

David J. Kappos
*Director of the United States Patent and Trademark Office*